United States Patent
Reimann

(10) Patent No.: US 12,164,291 B2
(45) Date of Patent: Dec. 10, 2024

(54) SEPARATION OF STATES OF MECHANICAL PRESSES BY ANALYZING TRAINED PATTERNS IN A NEURAL NETWORK

(71) Applicant: SIEMENS AKTIENGESELLSCHAFT, Munich (DE)

(72) Inventor: Thorsten Reimann, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/633,186

(22) PCT Filed: Jul. 6, 2020

(86) PCT No.: PCT/EP2020/068923
§ 371 (c)(1),
(2) Date: Feb. 4, 2022

(87) PCT Pub. No.: WO2021/023449
PCT Pub. Date: Feb. 11, 2021

(65) Prior Publication Data
US 2022/0269255 A1  Aug. 25, 2022

(30) Foreign Application Priority Data
Aug. 6, 2019 (EP) .................................. 19190221

(51) Int. Cl.
*G05B 23/02* (2006.01)
*G06N 3/048* (2023.01)
*G06N 3/084* (2023.01)

(52) U.S. Cl.
CPC .......... *G05B 23/024* (2013.01); *G06N 3/048* (2023.01); *G06N 3/084* (2013.01)

(58) Field of Classification Search
CPC ...... G05B 23/02; G05B 23/024; G05B 23/27; G05B 23/0221; G06N 3/04; G06N 3/08;
(Continued)

(56) References Cited

U.S. PATENT DOCUMENTS 4,633,720 A * 1/1987 Dybel ...................... G01D 1/12
702/41
6,301,572 B1 * 10/2001 Harrison ................ G01H 1/003
702/54
(Continued)

FOREIGN PATENT DOCUMENTS

CN  107560849 A * 1/2018
EP  3381646 A1  10/2018

OTHER PUBLICATIONS

U.S. Appl. No. 62/817,956 Yan; Weizhong et al., filed Mar. 13, 2019. (Year: 2019).*
(Continued)

*Primary Examiner* — Randall K. Baldwin
(74) *Attorney, Agent, or Firm* — Lempia Summerfield Katz LLC

(57) ABSTRACT

A computer-implemented method, a data processing system, and a computer program product for indicating a failure of a manufacturing process, as well as a corresponding manufacturing machine and a computer-implemented method of training a machine learning system (MLS) for indicating states of a manufacturing process, are provided. An input signal of a sensor is transformed into a parameter. The parameter is provided to the MLS, which derives latent features. The latent features are mapped into one of a number of distinct clusters each representing a mode of the manufacturing process. A failure of the manufacturing process based on the different states of the manufacturing process may be indicated.

12 Claims, 3 Drawing Sheets

(58) Field of Classification Search
CPC ...... G06N 3/0481; G06N 3/084; G06N 3/048; B30B 15/00; B30B 15/26; B30B 15/94
See application file for complete search history.

(56) References Cited

U.S. PATENT DOCUMENTS

| | | | | |
|---|---|---|---|---|
| 7,444,310 | B2* | 10/2008 | Meng | G06Q 10/10 |
| | | | | 706/45 |
| 2016/0034809 | A1* | 2/2016 | Trenholm | G06N 3/02 |
| | | | | 706/20 |
| 2017/0315516 | A1* | 11/2017 | Kozionov | G01M 13/045 |
| 2019/0118443 | A1* | 4/2019 | Asaoka | B29C 45/76 |
| 2019/0188584 | A1* | 6/2019 | Rao | G06Q 10/00 |
| 2019/0227525 | A1* | 7/2019 | Mehr | G06N 20/00 |
| 2019/0228312 | A1* | 7/2019 | Andoni | G06F 18/2433 |
| 2019/0294999 | A1* | 9/2019 | Guttmann | G06N 5/047 |
| 2019/0354832 | A1* | 11/2019 | Bronstein | G06F 17/18 |
| 2020/0104200 | A1* | 4/2020 | Kocberber | G06N 3/082 |
| 2020/0292608 | A1* | 9/2020 | Yan | G06N 3/0445 |
| 2021/0004682 | A1* | 1/2021 | Gong | G06N 3/08 |

OTHER PUBLICATIONS

Yu, Wanke, and Chunhui Zhao. "Broad convolutional neural network based industrial process fault diagnosis with incremental learning capability." IEEE Transactions on Industrial Electronics 67.6 (Jul. 2019): 5081-5091. (Year: 2019).*

Price, Thomas, and Eytan Lerba. "Configuring Alarm Setting Using Machine Learning." (2017): 1-37 (Year: 2017).*

Lee, Ki Bum, Sejune Cheon, and Chang Ouk Kim. "A convolutional neural network for fault classification and diagnosis in semiconductor manufacturing processes." IEEE Transactions on Semiconductor Manufacturing 30.2 (2017): 135-142. (Year: 2017).*

Gupta, Aditya, et al. "Extreme Learning Machines with frequency based noise filtering for prediction of critical digressions in a noisy industrial process." 2017 14th IEEE India Council International Conference (INDICON). IEEE, 2017. (Year: 2017).*

Monteiro, Rodrigo, et al. "Convolutional neural networks using fourier transform spectrogram to classify the severity of gear tooth breakage." 2018 International conference on sensing, diagnostics, prognostics, and control (SDPC). IEEE, 2018: 490-496 (Year: 2018).*

Widodo, Achmad, and Bo-Suk Yang. "Support vector machine in machine condition monitoring and fault diagnosis." Mechanical systems and signal processing 21.6 (2007): 2560-2574. (Year: 2007).*

Teti, Roberto, et al. "Advanced monitoring of machining operations." CIRP annals 59.2 (2010): 717-739. (Year: 2010).*

Aghazadeh, Fatemeh, Antoine Tahan, and Marc Thomas. "Tool condition monitoring using spectral subtraction and convolutional neural networks in milling process." The International Journal of Advanced Manufacturing Technology 98 (2018): 3217-3227. (Year: 2018).*

Notification of Transmittal of the International Preliminary Report on Patentability for International Application No. PCT/EP2020/068923 mailed Jul. 28, 2021.

Yuan, Zhuang, Laibin Zhang, and Lixiang Duan. "A novel fusion diagnosis method for rotor system fault based on deep earning and multi-sourced heterogeneous monitoring data." Measurement Science and Technology 29.11 (2018): 115005.

Wang, Jinjiang, et al. "Digital Twin for rotating machinery fault diagnosis in smart manufacturing." International Journal of Production Research 57.12 (2019): 3920-3934.

* cited by examiner

SEPARATION OF STATES OF MECHANICAL PRESSES BY ANALYZING TRAINED PATTERNS IN A NEURAL NETWORK

This application is the National Stage of International Application No. PCT/EP2020/068923, filed Jul. 6, 2020, which claims the benefit of European Patent Application No. EP 19190221.2, filed Aug. 6, 2019. The entire contents of these documents are hereby incorporated herein by reference.

BACKGROUND

The present embodiments relate to indicating a failure of a manufacturing process and training a machine learning system (MLS) for indicating states of a manufacturing process.

In pressing sheets or plates of different materials (e.g., steel, copper, polymer, etc.), cracks in a sheet/plate (or manufactured workpiece), ripples of the sheet/plate or manufactured workpiece), and other failures of the manufacturing process regularly occur. These failures of the manufacturing process are not detected during the pressing process, but only after a number of pressing cycles during an automatically or manually conducted visual inspection. Further, during the pressing process, micro-cracks that are not detected during the visual inspection, but only much later during final assembly or even operation, may occur.

The later such failures of the manufacturing process are detected the more expensive correction becomes.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a reliable and fast automatic indication of a failure of a manufacturing process is provided.

The present embodiments provide a computer-implemented method of indicating a failure of a manufacturing process, and a corresponding data processing system and a corresponding computer program product, as well as a corresponding manufacturing system. The present embodiments further include a computer-implemented method of training a machine learning system (MLS) for indicating states of a manufacturing process.

According to a first aspect, a computer-implemented method of indicating a failure of a manufacturing process includes the acts: a) receiving at least one input signal; b) transforming the at least one input signal; c) deriving latent features; d) mapping the derived latent features; and e) optionally indicating a failure of the manufacturing process. In act a), at least one input signal is received. The received at least one input signal is based on at least one physical quantity, which is monitored during the manufacturing process by at least one sensor. In act b), the received at least one input signal is transformed into at least one parameter. The at least one parameter has a different domain and additionally or alternatively a different reference value than the received at least one input signal. In act c), latent features are derived based on the at least one parameter using a machine learning system (MLS). The MLS is trained on deriving latent features based on the at least one parameter indicative of specific states of the manufacturing process. In act d), the derived latent features are mapped into one of a number of distinct clusters in a two dimensional (2D) cluster space. The clusters represent different states of the manufacturing process. In act e), a failure of the manufacturing process is indicated based on the different states of the manufacturing process.

According to a second aspect, a data processing system for indicating a failure of a manufacturing process includes a device (e.g., a processor) for carrying out the acts of the method according to the first aspect.

According to a third aspect, a computer program product for indicating a failure of a manufacturing process includes instructions that, when the program is executed by a computer, cause the computer to carry out the acts of the method according to the first aspect.

According to a fourth aspect, a manufacturing system includes the data processing system according to the second aspect and at least one sensor. The at least one sensor generates at least one input signal by monitoring at least one physical quantity during conducting a manufacturing process. The generated at least one input signal is provided to the data processing system.

At least one physical quantity like vibrations, temperature, force, torque, rotational/angular/linear speed/acceleration, and/or the like occurring during the manufacturing process is monitored by the at least one sensor. Therefore, at least one appropriate sensor is provided, such as a temperature sensor, a vibration sensor, an acceleration sensor, a position sensor, a force sensor, etc. The sensor is positioned at a corresponding position where the respective physical quantity may be monitored by the sensor.

More than one physical quantity may be monitored with appropriate sensors (e.g., vibrations such as vibrations of a machine part or a workpiece) may be monitored with a vibration sensor. A temperature during the manufacturing process (e.g., a temperature of a machine part, of a chamber or of a workpiece) may be monitored with a temperature sensor. A rotational speed may be monitored with a rotation sensor. An acceleration or force (or speed derived from the acceleration/force) may be monitored with an acceleration or force sensor.

The respective sensor generates a corresponding input signal based on the respective monitored physical quantity. In act a), the generated input signal is provided to and received by the data processing system (e.g., at an interface of a receiver).

In act b), the received at least one input signal is transformed into at least one parameter. For example, the input signal may be normalized and additionally or alternatively KPIs such as RMS, crest factor, and/or standard deviation may be derived as features of the input signal. Further, the input signal may additionally be transformed into another domain (e.g., a vibration signal may be transformed from the time domain ($F(t)$) into the frequency domain ($F(f)$) such as by a Fast Fourier Transformation (FFT)). An input signal based on a measured acceleration may be transformed from the time domain ($F(t)$) into the 3D-domain ($F(x,y,z)$). Further, the input signal may be transformed such that the feature has a different reference value than the input signal (e.g., an input signal based on a measured temperature may be transformed from degree Celsius (° C.) into Kelvin (K) or an input signal based on a measured speed that is a relative speed may be transformed (superimposed) into an absolute speed (rotating element moved by an arm of a machine of the manufacturing system)). Further, statistical values may be determined in the act of transforming. For example, in transforming, the input signal may first be transformed into another domain, and then, statistical features may be derived therefrom. All these transformations may be referred to as parameter engineering.

Machine learning algorithms or MLS build a mathematical model based on sample data, known as "training data", in order to make predictions or decisions without being explicitly programmed to perform the task. The at least one "engineered" parameter is provided to the MLS in act c). The MLS has been trained such that the MLS may derive latent features based on the provided at least one parameter indicative of specific states of the manufacturing process. Specific states such as failures of the manufacturing process (e.g., wrong manufacturing parameters, bad orientation of work pieces, malfunctioning machine parts, etc.) manifest themselves in specific patterns of the at least one parameter or more than one parameter. Therefore, the MLS has been trained based on such patterns in a set of at least one training parameter indicative of at least one certain failure (e.g., state) of the manufacturing process.

The latent features derived by the MLS from the at least one provided parameter resemble one of a number of specific trained patterns. The MLS extracts latent information provided with the at least one parameter and connects this latent information internally (e.g., based on trained weights) into the latent features, which provide different information about states such as failures of the manufacturing process than the at least one provided parameter.

In act d), the derived latent features are mapped into one cluster. The cluster is one of a number of distinct clusters in the 2D cluster space. Thereto, the latent features derived by the MLS are mapped with a specific algorithm into two values (e.g., an X-coordinate and a Y-coordinate) that resemble their difference to other latent features derived by the MLS based on another provided at least one parameter. The latent features derived by the MLS forming the at least one parameter have a specific pattern. The pattern may be transformed by the algorithm into the two values specific for the respective pattern of the latent features. Each of the distinct clusters resembles a different state of the manufacturing process (e.g., idle, start-up phase, normal operation, and one or a number of different failures of the manufacturing process). Also, a class and additionally or alternatively a severity of a failure of the manufacturing process may be derivable from the cluster.

In the optional act e), a failure of the manufacturing process (and a corresponding class and/or severity) is indicated based on the state of the manufacturing process resembled by the cluster. The failure of the manufacturing process, which is based on the pattern of the latent features derived by the MLS from the at least one parameter, may be reported to a user (e.g., technician, mechanic personnel, shift supervisor, facility engineer etc.) who may initiate the necessary steps for bringing the manufacturing process back to normal operation (e.g., eliminating the cause of the failure of the manufacturing process).

Additionally, the method may include a further act of automatically initiating appropriate counter measures, such as repositioning of movable machine parts or workpieces, refilling of coolant or lubricant, etc., to bring the manufacturing process back to normal operation.

The manufacturing system may include machines and machine parts using which the manufacturing process may be conducted. The at least one sensor generates the at least one input signal based on the at least one physical quantity monitored during the manufacturing process.

With the present embodiments, it is possible to detect states of the manufacturing process and optionally to automatically indicate failures in the manufacturing process, such that the manufacturing process may be brought back to normal operation faster and more reliable.

According to a refinement of the present embodiments, the at least one monitored physical quantity is a pressing force of a press, and the at least one generated input signal is a force-over-time signal. Further, a failure in a pressed workpiece is indicated as the failure of the manufacturing process.

According to a further refinement of the present embodiments, the manufacturing system further includes a press. The at least one sensor is a force sensor generating a force signal by monitoring a pressing force of the press.

At least one force sensor (e.g., four force sensors equally distributed over the press) is monitoring the pressing force of the press. The at least one force sensor may be a piezo-electric sensor or the like. The at least one force sensor measures the pressing force over time and produces the at least one corresponding input signal.

The at least one input signal based on the pressing force of the press is transformed into the at least one parameter. The at least one parameter is provided to the MLS that has been trained on respective training parameters based on training input signals based on pressing forces. The MLS derives the latent features that are mapped into one of the number of respective clusters that represent states of the manufacturing process such as a failure where a work piece formed by the press from a sheet or plate has cracks or ripples or micro-cracks, etc.

With the present embodiments, states and, for example, failures of the manufacturing process such as cracks, ripples, micro-cracks, and the like in the manufactured workpieces may be reliably and fast detected.

According to a refinement of the present embodiments, the monitored pressing force is a force of a plunger (or punch) of the press and additionally or alternatively a force on a mold of the press.

In one embodiment, at least four force sensors are positioned either at the mold or at the plunger. Each of the four force sensors is arranged in one of a front left portion, a front right portion, a rear left portion, or a rear right portion of the mold or the plunger, respectively.

The pressing force of the plunger or on the mold may be particularly effectively measured and processed.

According to a refinement of the present embodiments, the received at least one input signal is transformed by selecting a predefined time slice of the signal and additionally or alternatively a data cleansing and additionally or alternatively a normalization and/or a centering.

Only a predefined time slice of the at least one input signal may be selected and used as the at least one parameter. For example, a pressing force over time signal may be transformed by selecting only a time slice of the signal, where there is a measured actual pressing force and, for example, a time slice of the signal, from where the plunger makes contact to the sheet or plate until the pressing is finished and the plunger leaves the work piece pressed from the sheet or the plate.

The received at least one input signal may also be processed by a data cleansing. In the data cleansing gaps, jumps and the like in the at least one received input signal are filled, corrected, and the like, such that a continuous and smooth signal is provided as parameter.

With normalization, the at least one input signal is normalized to a predefined value range (e.g., from 0 to 1), and additionally or alternatively, the metering time period is normalized. For example, each input signal may be normalized to a predefined number of time steps of a predefined length, such that a too long signal is cut and a too short signal is extended.

The received at least one input signal may also be centered around a specific value or raise in the input signal. For example, the input signals based on the pressing force of the press may be centered by convolving each input signal with itself.

With the transformation, the at least one input signal is prepared such that the MLS may optimally derive the latent features.

According to a refinement of the present embodiments, the MLS is a neural network (NN) (e.g., a deep NN or a convolutional NN). This provides for storing specific coherent patterns of the timeseries in the latent space so that the specific coherent patterns may be distinguished.

Artificial neural networks (ANN) are systems (e.g., computing systems) inspired by biological neural networks that constitute animal brains. ANNs "learn" to perform tasks by considering examples or training data (e.g., labelled), generally without being designed with any task-specific rules. During an initial learning or training phase, ANNs automatically generate identifying characteristics from the training data (e.g., labelled). ANNs include a collection of connected nodes (e.g., artificial neurons) that loosely model the neurons in a biological brain. Each connection (e.g., synapses in the biological brain) may transmit a signal from one node to another. A node that receives a signal may process the signal and then signal to subsequent neurons connected to the node. In common ANN implementations, the signal at a connection between nodes is a real number (e.g., 0 . . . 1), and the output of each artificial neuron is computed by some non-linear function of the sum of its inputs (e.g., from other nodes). The connections between nodes are referred to as "edges". The edges in ANNs may each have a weight that is adjusted during training of the ANNs. The weight increases or decreases the strength of the signal at the corresponding edge. Nodes may each have a threshold such that the signal is only sent if an aggregate signal exceeds that threshold. Typically, nodes are aggregated into layers. Different layers may perform different kinds of transformations on corresponding inputs. Signals travel from a first layer or input layer to a last layer or output layer, possibly after traversing the layers multiple times.

In other words, an ANN is a network of simple elements, the nodes or artificial neurons, that receive input. After receiving input, the nodes change their internal state (e.g., activation) according to that input, and produce output depending on the input and activation. The network forms by connecting the output of certain nodes to the input of other nodes forming a directed, weighted graph. The weights as well as the functions that compute the activation of each node may be modified during initial learning/training, which is governed by a learning rule or paradigm.

A node receiving an input from at least one predecessor neuron consists of the following components: an activation; the node's state; depending on a discrete time parameter, optionally a threshold, which stays fixed unless changed by a learning/training function; an activation function (e.g., hyperbolic tangent function, sigmoid function, softmax function, rectifier function, etc.) that computes the new activation at a given time; and the net input and an output function computing the output from the activation (e.g., often the output function is the identity function). An important characteristic of the activation function is that the activation function provides a smooth transition as input values change (e.g., a small change in input produces a small change in output).

An input node has no predecessor but serves as input interface for the whole ANN. Similarly, an output node has no successor and thus serves as output interface of the whole ANN. An ANN consists of edges/connections, each edge transferring the output of a node (e.g., predecessor) to the input of another, succeeding node (e.g., successor). Additionally to the assigned weight, an edge may have a bias term added to a total weighted sum of inputs to serve as a threshold to shift the activation function. The propagation function computes the input to the succeeding node (e.g., successor) from the outputs of preceding nodes (e.g., predecessors) and may include the bias value.

The deep NN includes more than one layer (e.g., more than four layers, more than seven layers, or ten or more layers). Each layer may include a number of neurons or nodes. In one embodiment, each layer may contain ten or more (e.g., 50 or more or 100 or more) neurons.

The convolutional NN is a deep NN with convolutional layers. In the convolutional layers, there are filters that are convolved with the input. Each filter is equivalent to a weights vector that is to be trained.

The accuracy of the mapped clusters and, thus, the certainty of the state of the manufacturing process based on the derived latent features of the deep or convolutional NN are increased.

According to a refinement of the present embodiments, the MLS is deployed on a cloud-based system or on a local computer system of a premise where the manufacturing process is conducted.

The cloud-based system may be located at a side of a manufacturer of the manufacturing system, which conducts the manufacturing process, or at a side of the user of the manufacturing system.

In case the MLS is deployed on the cloud-based system, the MLS may be used for a number of different manufacturing systems and manufacturing processes of the same type (e.g., exact same type).

In case the MLS is deployed on the local computer system of a premise where the manufacturing process is conducted, the MLS is exclusively used for the respective manufacturing process.

Consequently, the MLS may either be used (e.g., globally) for different manufacturing systems and for different manufacturing processes and, thus, the capacity of the MLS may be optimally used, or the MLS may be locally used and, thus, the MLS may be more specialized for the respective manufacturing system or rather manufacturing process.

According to a refinement of the present embodiments, a t-distributed Stochastic Neighbor Embedding (t-SNE) method is used to map the derived latent features into one of the number of distinct clusters.

t-SNE is a machine learning algorithm for visualization. It is a nonlinear dimensionality reduction technique well-suited for embedding high-dimensional data for visualization in a low-dimensional space of two or three dimensions. Specifically, the t-SNE models each high-dimensional object (e.g., the latent features) by a 2D or three-dimensional (3D) point such that similar objects are modelled by nearby points (e.g., clusters) and dissimilar objects are modelled by distant points with high probability. In one embodiment, the latent features derived by the MLS (e.g., hundreds of values) are reduced or mapped into two values resembling points in the 2D cluster space, where the different states of the manufacturing process may be discriminated based on the distinct clusters in the 2d cluster space.

According to a fifth aspect, a computer-implemented method of training a machine learning system (MLS) for indicating states of a manufacturing process includes the acts i) generating a set of at least one training parameter and of corresponding training results; and ii) training the machine learning system. In act i), a set of at least one training parameter is generated based on training input signals based on at least one physical quantity monitored during a number of manufacturing processes using at least one sensor. Further corresponding training results of the respective manufacturing processes are included in the set. In act ii), the MLS is trained using the set of the at least one training parameter and of corresponding training results.

A learning or rather training rule or paradigm is an algorithm that modifies the parameters of a respective ANN in order for a given input to the ANN to produce a favored output. This training typically amounts to modifying the weights and thresholds of the variables within the ANN. Given a specific task to solve and a class of functions, learning may be using a set of observations to find the one function of the class of functions that solves the task in some optimal sense. This entails defining a cost function such that for the optimal solution the cost is minimal and no other solution has a cost less than the cost of the optimal solution. The cost function is an important concept in learning, as the cost function is a measure of how far away a particular solution is from an optimal solution to the problem to be solved. Learning algorithms search through the solution space to find a function that has the smallest possible cost. For applications where the solution is data dependent, the cost is a function of the observations; otherwise, the model would not relate to the data. The cost is frequently defined as a statistic to which only approximations may be made. It is possible to define an arbitrary cost function; however, a particular cost function may be used either because the particular cost function has desirable properties (e.g., convexity) or because the particular cost function arises naturally from a particular formulation of the problem.

An ANN may be discriminatively trained with a standard backpropagation algorithm. Backpropagation is a method to calculate the gradient of a loss function (e.g., produces the cost associated with a given state) with respect to the weights in the ANN. The weight updates of backpropagation may be done via stochastic gradient descent. The choice of the cost function depends on factors such as the learning type (e.g., supervised, unsupervised, reinforcement, etc.) and the activation function. Commonly, the activation function and cost function are the softmax function and cross entropy function, respectively.

In other words, training an ANN essentially provides selecting one model from the set of allowed models (or, in a Bayesian framework, determining a distribution over the set of allowed models) that minimizes the cost. Commonly, some form of gradient descent is deployed, using backpropagation to compute the actual gradients. This is done by simply taking the derivative of the cost function with respect to the network parameters and then changing those parameters in a gradient-related direction. Backpropagation training algorithms fall into three categories: steepest descent (e.g., with variable learning rate and momentum, resilient backpropagation), quasi-Newton (e.g., Broyden-Fletcher-Goldfarb-Shanno, one step secant), Levenberg-Marquardt, and conjugate gradient (e.g., Fletcher-Reeves update, Polak-Ribiére update, Powell-Beale restart, scaled conjugate gradient).

Common training paradigms include supervised learning, unsupervised learning, and reinforcement learning. Supervised learning uses a set of example pairs, and the aim is to find a function in the allowed class of functions that matches the examples. In other words, the mapping implied by the data is inferred; the cost function is related to the mismatch between the mapping of the ANN and the data, and the cost function implicitly contains prior knowledge about the problem domain. The cost may be the mean-squared error, which tries to minimize the average squared error between the ANN's output and a target value over all the example pairs. Minimizing this cost using gradient descent for the class of ANNs referred to as multilayer perceptrons (MLP) produces the backpropagation algorithm for training ANNs. In unsupervised learning, some data is given, and the cost function to be minimized may be any function of the data and the ANN's output. The cost function is dependent on the task and any a priori assumptions (e.g., implicit properties or parameters of the model, observed variables, etc.). In reinforcement learning, data is usually not given, but generated by an agent's interactions with the environment. At each point in time, the agent performs an action, and the environment generates an observation and an instantaneous cost according to some (e.g., usually unknown) dynamics. The aim is to discover a policy for selecting actions that minimizes some measure of a long-term cost (e.g., the expected cumulative cost). The environment's dynamics and the long-term cost for each policy are usually unknown, but may also be estimated. The environment is commonly modelled as a Markov decision process (MDP) with states and actions with the following probability distributions: the instantaneous cost distribution, the observation distribution, and the transition, while a policy is defined as the conditional distribution over actions given the observations. Taken together, the two then define a Markov chain (MC). The aim is to discover the policy (e.g., the MC) that minimizes the cost.

To each at least one training parameter in the generated set belongs a corresponding result. There may be at least 100, at least 50, or at least 1000 pairs of training parameter and corresponding training result included in the set. The at least one training parameter corresponds to the at least one parameter described above for the first to fourth aspect. The training input signals, which correspond to the at least one input signal described above for the first to fourth aspect, is transformed into the at least one training parameter. The transformation is the same as described above for the first to fourth aspect (cf., act b)). For example, at least one physical quantity (e.g., a pressing force or four pressing forces at different locations of a press) is monitored with at least one respective sensor during a number of cycles (e.g., 1000 cycles) of a manufacturing process. At each cycle, the at least one sensor generates a training input signal corresponding to the monitored physical quantity (e.g., a force-over-time signal). Further, in each cycle, the state of the manufacturing process is determined (e.g., normal operation, failure of the manufacturing process (cracks in a workpiece, etc.), and the like). The determined state of the manufacturing process is the trainings result for the respective trainings input signal or rather trainings parameter.

Based on the generated set of the at least one training parameter and of corresponding training results, the MLS is trained. Thereto, the MLS is provided with one training parameter of the set, and the MLS is optimized until the training result may be identified in a cluster space into which the latent features generated by the MLS have been mapped (e.g., by a t-SNE method).

The MLS used for deriving the latent features is to learn cues in patterns of the provided at least one parameter. Therefore, the generated set contains training parameters based on training input signals generated during a certain failure of the manufacturing process and also based on training input signals generated during normal operation. Further, the set may contain training parameters based on training input signals generated during idle times and/or a start-up phase. The set of the at least one training parameter is "labelled" with the respective states of the manufacturing process (e.g., trainings results) present while the corresponding training input signal was generated (e.g., by the respective sensor(s)).

According to a refinement of the present embodiments, the training input signals are real input signals from a real machine of the manufacturing system or manufacturing process, or simulated input signals from an artificial model of the machine of the manufacturing system or manufacturing process, or a combination of both.

Thus, only a small set of "real" training parameters and corresponding training results are to be generated from real cycles (e.g., test cycles) of the manufacturing process. This significantly reduces the cost for generating the set. Further, "incomplete" sets (e.g., training signals during a specific state of the manufacturing process such as a certain failure of the manufacturing process are missing) may be complemented with virtually generated training signals during specific states of the manufacturing process adjusted in the model.

According to a refinement of the present embodiments, the MLS is a neural network (NN) (e.g., a pre-trained NN).

By training a pre-trained neural network that has been generally conditioned for deriving information from industrial data, the time and amount of sets of training feature(s) may be significantly reduced.

According to a refinement of the present embodiments, the training input signals are transformed into the at least one training parameter of the set by selecting a predefined time slice of the training input signals and/or a data cleansing and/or a normalization and/or a centering and/or using parts of predefined length of the training input signals, where, for example, the parts of the predefined length of the training input signals are selected according to a Gaussian distribution.

The selecting of the predefined time slice of the signal, the data cleansing, the normalization, and the centering are the same as for the at least one input signal as described above for the first to fourth aspect of the present embodiments.

Instead of the whole training input signal, only parts of the predefined length may be used as parameters for training the MLS. In one embodiment, the predefined length of the parts is equal to or smaller than 10%, or equal to or smaller than 2% of the length of the training signal. For example, a training input signal (e.g., a force-over-time-signal) that has been normalized to 1000 time steps, where each time step has the same predefined time length, is divided into the parts of the predefined length. For example, the normalized training input signal is divided into parts of a length of 16 time steps. For training the MLS, only those "important" parts of the training input signal that contain the most information about the state of the manufacturing process or rather the trainings result are used as training parameter.

In one embodiment, the parts of one single training input signal may be used a number of times for training the MLS.

In one embodiment, the parts of the training input signals may be selected according to a Gaussian distribution and used as the training parameter. In selecting the parts of the training input signals based on the Gaussian distribution, the maximum of the Gaussian distribution may be placed at the part of the input training signals, where the most information about the state of the manufacturing process is contained.

Thereby, the training of the MLS may be accelerated, and the accuracy of the trained MLS may also be improved.

BRIEF DESCRIPTION OF THE DRAWINGS

The present invention and the corresponding technical field are subsequently explained in further detail by exemplary embodiments shown in the drawings. The exemplary embodiments only provide better understanding of the present invention and in no case are to be construed as limiting for the scope of the present invention. For example, it is possible to extract aspects of the subject-matter described in the figures and to combine the aspects of the subject-matter with other components and findings of the present description or figures, if not explicitly described differently. Equal reference signs refer to the same objects, such that explanations from other figures may be supplementarily used.

DETAILED DESCRIPTION

Figure 1:
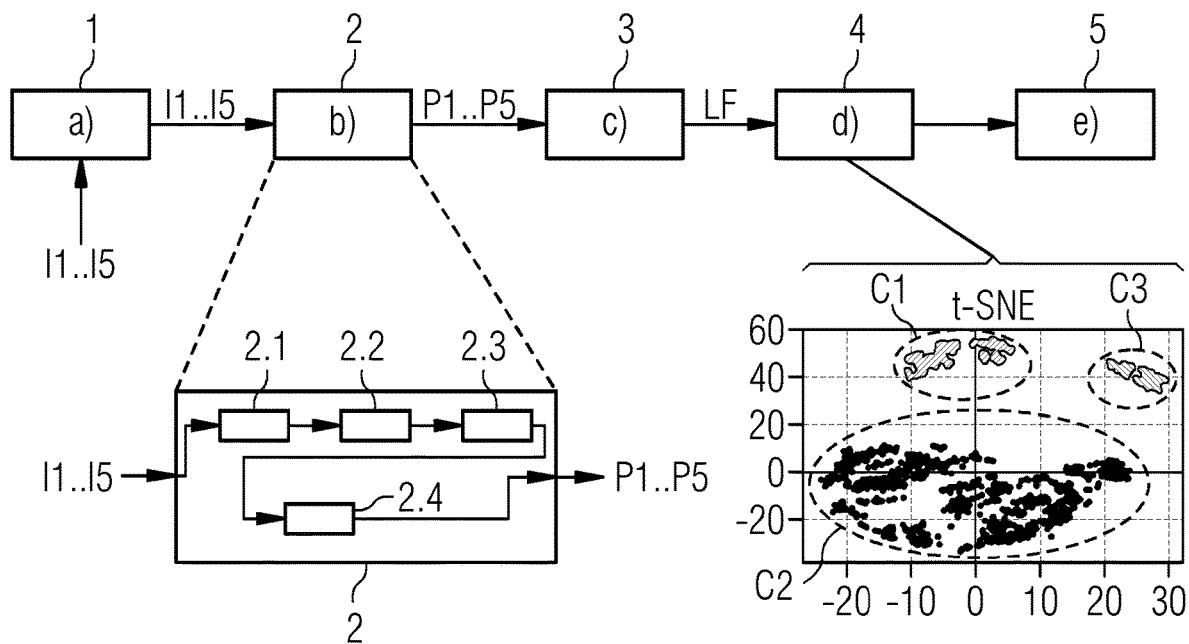
FIG. 1 shows a schematic flow-chart of one embodiment of a computer-implemented method of indicating a failure of a manufacturing process.

In FIG. 1, an embodiment of a computer-implemented method of indicating a failure of a manufacturing process is schematically depicted. The manufacturing process is forming work pieces by pressing of sheets or plates (e.g., made of steel).

The computer-implemented method includes the acts of: a) receiving 1 at least one input signal; b) transforming 2 the at least one input signal; c) deriving 3 latent features; d) mapping 4 the derived latent features; and e) optionally indicating 5 a failure of the manufacturing process.

In act a), the at least one input signal is received. Five input signals I1-I5 are, for example, received. Four of the five input signals I1-I4 are force-over-time signals based on a pressing force over time of a plunger of a press on a mold of the press measured by four respective force sensors. The last of the five input signals I5 is a position-over-time signal based on a position over time of the plunger measured by a respective position sensor.

In act b), the five input signals I1-I5 are transformed. The act b) includes, for each input signal I1-I5, the sub-acts: selecting 2.1 a predefined time slice of the signal; data cleansing 2.2; normalization 2.3; and centering 2.4.

The sub-acts 2.1-2.4 may be applied in any order to the signals I1-I5. Each input signal I1-I5 is appropriately cut by selecting 2.1 the predefined time slice of the signal. Only the time slice of the input signals I1-I5 where a pressing force or movement is present is selected. Then, the time slices are cleansed, whereby gaps or jumps in the curve progression of the signals or rather selected time slices are filled or corrected such that a continuous and smooth curve progression is present in the signals/selected time slices. The time slices are further normalized. In the normalizing 2.3, the values may be normalized to a predefined range (e.g., 0-1), or the time scale may be normalized to a predefined number of time steps or both. Here, the time slices are all normalized to 1000 time steps of predefined length (e.g., a time step has a time length of 1 ms [Millisecond]). Also, the curve progressions of the signals/time slices are centered, such that in each signal/time slice, the pressing force or position starts to change at the same time step. The centering 2.4 is done by convolving each signal or rather time slice with itself. The selected, cleansed, normalized, and centered signals/time slices are forwarded as the parameters P1-P5.

In act c), the latent features LF are derived from the parameters P1-P5 of act b). The five parameters P1-P5 (e.g., four force-based and one position-based parameter) are provided to a convolutional neural network (NN). The convolutional NN has one input layer, five hidden layers, and one output layer. The parameters P1-P5 are provided to the input layer. The convolutional NN has been trained to derive latent features LF based on the parameters P1-P5. The latent features LF provide information about a state of the manufacturing process (e.g., normal operation or a certain failure of the manufacturing process). The information about the manufacturing process contained in the parameters P1-P5 is extracted and newly combined into the latent features LF by the convolutional NN. Thereto, in each layer of the convolutional NN, trained weights are applied. The derived latent features LF have a specific pattern indicative of the state of the manufacturing process. The latent features LF may either be provided by the output layer or by one of the hidden layers or a combination of both.

In act d), the derived latent features LF are mapped with a t-SNE algorithm to two values resembling a point in a two dimensional (2D) cluster space. With the t-SNE algorithm, similar patterns of the latent features LF of different cycles of the manufacturing process are grouped together and different patterns of the latent features LF are put into other groups in the 2D cluster space. Thereby, clusters C1-C3 of latent features LF are generated, where each cluster C1-C3 resembles one specific state of the manufacturing process. With the mapped cluster C1-C3, the state of the manufacturing process becomes apparent.

In optional act e), a failure of the manufacturing process is indicated, for example, to a user such as a technician, mechanic personnel, shift supervisor, facility engineer, etc. The failure is determined based on the respective clusterq C1 . . . C3, which indicates the respective state of the manufacturing process and to which the pattern of latent features LF derived by the convolutional NN belongs.

The computer-implemented method of indicating a failure of a manufacturing process may be provided in form of the computer program product for indicating a failure of a manufacturing process.

Figure 2:
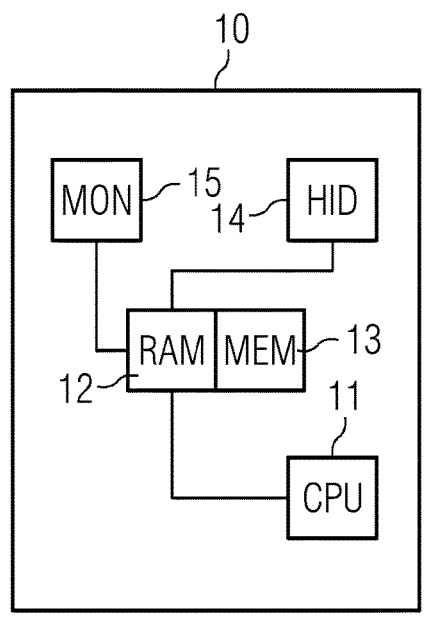
FIG. 2 shows a schematic view of one embodiment of a data processing system for indicating a failure of a manufacturing process.

In FIG. 2, the data processing system 10 for indicating a failure of a manufacturing process is schematically depicted. The data processing system 10 is arranged and configured to execute the computer-implemented method of indicating a failure of a manufacturing process of FIG. 1.

The data processing system 10 may be a personal computer (PC), a laptop, a tablet, a server, a distributed system (e.g., cloud system), and the like. The data processing system 10 includes a central processing unit (CPU) 11, a memory having a random access memory (RAM) 12, and a non-volatile memory (MEM) 13 (e.g., hard disk), a human interface device (HID) 14 (e.g., keyboard, mouse, touchscreen etc.) and an output device (MON) 15 (e.g., monitor, printer, speaker, etc.). The CPU 11, RAM 12, HID 14, and MON 15 are communicatively connected via a data bus. The RAM 12 and MEM 13 are communicatively connected via another data bus. The computer program product for indicating a failure of a manufacturing process may be loaded into the RAM 12 from the MEM 13 or another computer-readable medium. According to the computer program product, the CPU executes the acts a) to d) and optionally e) of the computer-implemented method of indicating a failure of a manufacturing process of FIG. 1. The execution may be initiated and controlled by a user via the HID 14. The status and/or result of the executed computer program may be indicated to the user by the MON 15. The result of the executed computer program may be permanently stored on the non-volatile MEM 13 or another computer-readable medium.

For example, the CPU 11 and RAM 12 for executing the computer program may include a number of CPUs 11 and a number of RAMs 12, for example, in a computation cluster or a cloud system. The HID 14 and MON 15 for controlling execution of the computer program may be comprised by a different data processing system such as a terminal communicatively connected to the data processing system 10 (e.g., cloud system).

Figure 3:
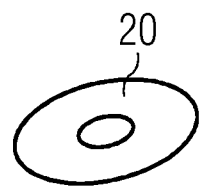
FIG. 3 shows a schematic view of one embodiment of a computer-readable medium having stored thereon a computer program product for indicating a failure of a manufacturing process.

In FIG. 3, the computer-readable medium 20 having stored thereon the computer program product for indicating a failure of a manufacturing process is schematically depicted.

Here, exemplarily, a computer-readable storage disc 20 such as a Compact Disc (CD), Digital Video Disc (DVD), High Definition DVD (HD DVD) or Blu-ray Disc (BD) has stored thereon the computer program product for indicating a failure of a manufacturing process. However, the computer-readable medium may also be a data storage such as a magnetic storage/memory (e.g., magnetic-core memory, magnetic tape, magnetic card, magnet strip, magnet bubble storage, drum storage, hard disc drive, floppy disc, or removable storage), an optical storage/memory (e.g., holographic memory, optical tape, Tesa tape, Laserdisc, Phasewriter (Phasewriter Dual, PD), or Ultra Density Optical (UDO)), a magneto-optical storage/memory (e.g., MiniDisc or Magneto-Optical Disk (MO-Disk)), a volatile semiconductor/solid state memory (e.g., Random Access Memory (RAM), Dynamic RAM (DRAM), or Static RAM (SRAM)), a non-volatile semiconductor/solid state memory (e.g., Read Only Memory (ROM), Programmable ROM (PROM), Erasable PROM (EPROM), Electrically EPROM (EEPROM), Flash-EEPROM (e.g. USB-Stick), Ferroelectric RAM (FRAM), Magnetoresistive RAM (MRAM), or Phase-change RAM).

Figure 4:
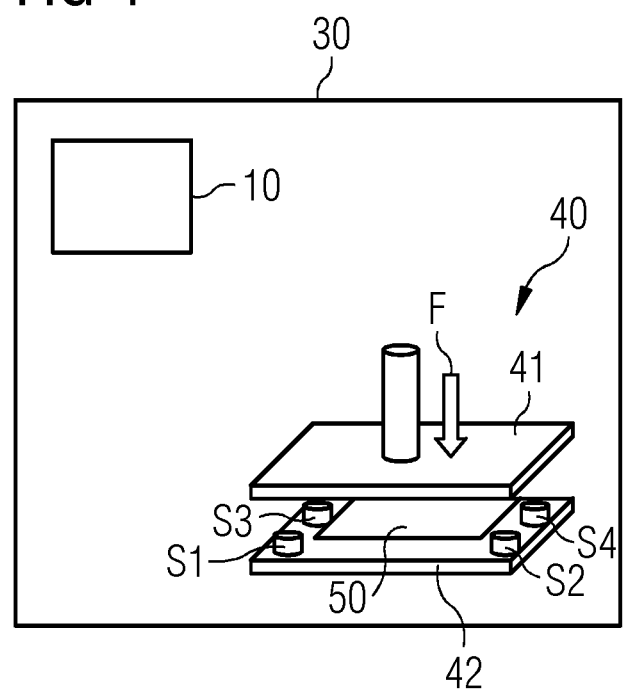
FIG. 4 shows a schematic view of one embodiment of the manufacturing system including the data processing system for indicating a failure of a manufacturing process and a press.

In FIG. 4, the manufacturing system 30 including the data processing system 10 for indicating a failure of a manufacturing process and a press 40 is schematically depicted. The manufacturing system 30 further includes four force sensors S1 . . . S4 and one position sensor (not depicted).

The press 40 includes a plunger 41 (or punch) and a mold 42 (or die). The four force sensors S1-S4 are arranged in a front left portion, a front right portion, a rear left portion, and a rear right portion of the mold 42. The plunger 41 may be driven by a motor via an eccentric or by a pneumatic or hydraulic drive. The plunger 41 is moved towards the mold 42 with a pressing force F such that a sheet or plate 50 (e.g., made of steel) is pressed into the mold 42 by the plunger 41.

Thereby, the sheet/plate 50 is deformed into a work piece by the pressing force F applied via the plunger 41. After the work piece has been formed from the sheet/plate 50, the plunger 41 is retracted. During this operation of the plunger 41, the four force sensors S1-S4 detect the pressing force F applied by the plunger 41 onto the mold 42 and generate corresponding force-over-time signals that are provided to the data processing system 10 for indicating a failure of a manufacturing process of FIG. 2 as the input signals I1-I4. Further, the position sensor determines the position of the plunger 41 relative to the mold 42 during the operation and generates a position-over-time signal that is provided to the data processing system 10 for indicating a failure of a manufacturing process of FIG. 2 as the input signal I5.

Figure 5:
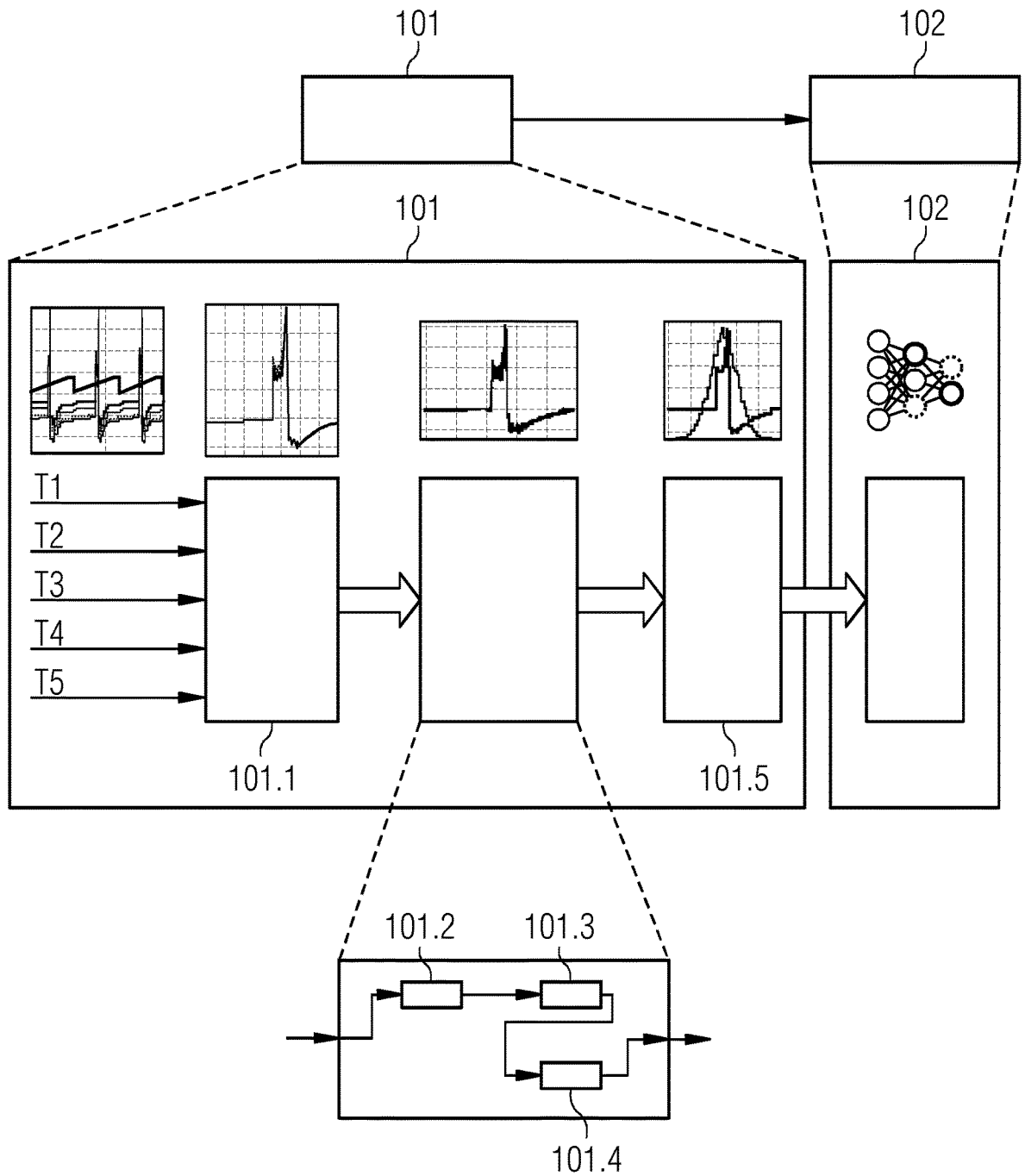
FIG. 5 shows a schematic view of one embodiment of a computer-implemented method of training a machine learning system for indicating states of a manufacturing process.

In FIG. 5, the computer-implemented method of training a machine learning system for indicating states of a manufacturing process is schematically depicted. The computer-implemented method of training a machine learning system for indicating states of a manufacturing process includes the acts: i) generating 101 a set of at least one training parameter and of corresponding training results; and ii) training 102 the machine learning system.

Five training parameters, for example, are used. The training parameters are generated much like the parameters in the computer-implemented method of FIG. 1. In a manufacturing system (e.g., the manufacturing system of FIG. 4), a number of cycles of the manufacturing process are run in order to generate training input signals T1-T5. In one embodiment, 1000 training cycles are run, but the training input signals T1-T5 may also be acquired during productive operation. In each cycle (e.g., training or productive) of the manufacturing process, the pressing force of a plunger on a mold while pressing a sheet or plate into a workpiece is detected by four force sensors. Further, the position of the plunger relative to the mold is detected by a position sensor during each cycle. The four force sensors generate force-over-time signals T1-T4, and the position sensor generates a position-over-time signal T5 in each cycle. The four force-over-time signals and the position-over-time signal of each of the 1000 cycles are provided as the training input signals T1-T5 of the set. Further, the state of the manufacturing process at each cycle is determined. These states of the manufacturing process include idle phase, start-up phase, normal operation, and one or more failures of the manufacturing process. The failures of the manufacturing process may include cracks in the sheet/plate or rather workpiece, ripples of the sheet/plate or rather workpiece, micro-cracks of the sheet/plate or rather workpiece, and the like after the pressing. These states of the manufacturing process are included in the set as the corresponding training results. Thereby, respective five training input signals T1-T5 and the corresponding training result (e.g., state of the manufacturing process) form one pair of training data (e.g., the five training input signals as input data for the training and the corresponding training result as (desired) output data for the training). The five training input signals T1-T5 may be labelled or tagged with the corresponding training result.

The generating 101 includes the sub-acts:—selecting 101.1 a predefined time slice of the training signal; data cleansing 101.2; normalization 101.3; centering 101.4; and using 101.5 parts of predefined length of the training input signals, where the parts of the predefined length of the training input signals are selected according to a Gaussian distribution.

The sub-acts 101.1-101.4 may be applied in any order to the training input signals T1-T5. The five training input signals T1-T5 are transformed as described for the input signals in the computer-implemented method of FIG. 1. The sub-acts 101.1-101.4 correspond to the sub-steps 2.1-2.4. Further, the five input training signals T1 . . . T5 or rather the selected time slices may not be used completely, but only parts of the predefined length may be used as training parameters. Thereto, the training input signals T1-T5 or rather selected time slices thereof may be divided into the parts of the predefined length. Here the time slices of 1000 time steps are divided into parts of 16 time steps.

Further, the part of the time slice of each training input signal T1-T5 that is used as the respective training parameter is selected according to a Gaussian distribution. The maximum of the Gaussian distribution is placed in a region of the training input signals T1-T5/time slices, where a maximal pressing force is detected. This region of the training input signals T1-T5/time slices contains the most information about the state of the manufacturing process. The corresponding parts are therefore more often selected as the input parameters via the Gaussian distribution than the parts belonging to regions of the training input signals T1-T5/time slices, where the plunger applies a lower pressing force onto the mold (e.g., from the time point where the plunger contacts the sheet/plate until before the plunger exerts the maximal pressing force as well as from the time point where the plunger decreases the pressing force and is retracted from the mold).

In act ii), a convolutional NN is trained for indicating states of the manufacturing process. Iteratively, the pairs of input data (e.g., five training parameters) and output data (e.g., corresponding training results; desired output data) are used for training the convolutional NN. In each iteration, the five training parameters, which are based on the respective five training input signals T1-T5, are provided to the convolutional NN. The internal weights of the hidden layers of the convolutional NN are adjusted until the optimization function converges to the corresponding training result. After the set of 1000 pairs of input data and output data have been used for training, the convolutional NN is sufficiently trained for indicating states of the manufacturing process.

The convolutional NN trained by the computer-implemented method of training a machine learning system for indicating states of a manufacturing process of FIG. 4 may be used in the computer-implemented method of indicating a failure of a manufacturing process of FIG. 1 and/or integrated in the data processing system for indicating a failure of a manufacturing process of FIG. 2, which may be included in the manufacturing system of FIG. 4.

Although specific embodiments have been illustrated and described herein, it will be appreciated by those of ordinary skill in the art that a variety of alternate and/or equivalent implementations exist. The exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment; various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples for the purpose of streamlining the disclosure. It is understood that the above description is intended to be illustrative and not restrictive.

The above description is intended to cover all alternatives, modifications, and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. The foregoing descriptions are not intended to be exhaustive or to limit the invention to the precise forms disclosed; many modifications and variations are possible in view of the above teachings.

The embodiments were chosen and described in order to best explain the principles of the invention and corresponding practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Further, the terms "first," "second," and "third," etc. are used merely as labels and are not intended to impose numerical requirements on or to establish a certain ranking of importance of corresponding objects. In the context of the present description and claims, the conjunction "or" is to be understood as including ("and/or") and not exclusive ("either . . . or").

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method of indicating a failure of a manufacturing process, the computer-implemented method comprising:
   receiving at least one input signal based on at least one physical quantity monitored during the manufacturing process by at least one sensor;
   transforming the received at least one input signal into at least one parameter having a different domain than the received at least one input signal;
   deriving latent features based on the at least one parameter using a machine learning system that is trained on deriving latent features based on the at least one parameter indicative of specific states of the manufacturing process, wherein the machine learning system is a convolutional neural network, the convolutional neural network having hidden layers;
   mapping, using a nonlinear dimensionality reduction technique, the derived latent features, provided by one of the hidden layers of the convolutional neural network, into one of a number of distinct clusters in a two dimensional (2D) cluster space, wherein the number of clusters represent different states of the manufacturing process, the different states of the manufacturing process including one or more failures of the manufacturing process, a severity of a failure of the one or more failures of the manufacturing process being derivable from a cluster of the number of distinct clusters; and
   indicating the failure of the manufacturing process based on the different states of the manufacturing process.

2. The computer-implemented method of claim 1, wherein the at least one monitored physical quantity is a pressing force of a press, and the at least one generated input signal is a force-over-time signal, and
   wherein the failure in a pressed workpiece is indicated as the failure of the manufacturing process.

3. The computer-implemented method of claim 2, wherein the monitored pressing force is a force of a plunger of the press, a force on a mold of the press, or the force of the plunger of the press and the force on the mold of the press.

4. The computer-implemented method of claim 1, wherein the received at least one input signal is transformed by selecting a predefined time slice of the signal, a data cleansing, a normalization, a centering, or any combination thereof.

5. The computer-implemented method of claim 1, wherein the machine learning system is deployed on a cloud-based system or on a local computer system of a premise where the manufacturing process is conducted.

6. The computer-implemented of claim 1, wherein a t-distributed Stochastic Neighbor Embedding method is used to map the derived latent features into one of the number of distinct clusters.

7. The computer-implemented method of claim 1, wherein the one or more failures of the manufacturing process include:
   cracks in a sheet, a plate, or a workpiece;
   ripples of the sheet, the plate, or the workpiece;
   micro-cracks of the sheet, the plate, or the workpiece; or
   any combination thereof.

8. A data processing system for indicating a failure of a manufacturing process, the data processing system comprising:
   a processor configured to:
      receive at least one input signal based on at least one physical quantity monitored during the manufacturing process by at least one sensor;
      transform the received at least one input signal into at least one parameter having a different domain than the received at least one input signal;
      derive latent features based on the at least one parameter using a machine learning system that is trained on deriving latent features based on the at least one parameter indicative of specific states of the manufacturing process, wherein the machine learning system is a convolutional neural network, the convolutional neural network having hidden layers;
      map, using a nonlinear dimensionality reduction technique, the derived latent features, provided by one of the hidden layers of the convolutional neural network, into one of a number of distinct clusters in a two dimensional (2D) cluster space, wherein the number of clusters represent different states of the manufacturing process, the different states of the manufacturing process including one or more failures of the manufacturing process, a severity of a failure of the one or more failures of the manufacturing process being derivable from a cluster of the number of distinct clusters; and indicate the failure of the manufacturing process based on the different states of the manufacturing process.

9. In a non-transitory computer-readable storage medium that stores instructions executable by a computer to indicate a failure of a manufacturing process, the instructions comprising:

receiving at least one input signal based on at least one physical quantity monitored during the manufacturing process by at least one sensor;

transforming the received at least one input signal into at least one parameter having a different domain than the received at least one input signal;

deriving latent features based on the at least one parameter using a machine learning system that is trained on deriving latent features based on the at least one parameter indicative of specific states of the manufacturing process, wherein the machine learning system is a convolutional neural network, the convolutional neural network having hidden layers;

mapping, using a nonlinear dimensionality reduction technique, the derived latent features, provided by one of the hidden layers of the convolutional neural network, into one of a number of distinct clusters in a two dimensional (2D) cluster space, wherein the number of clusters represent different states of the manufacturing process, the different states of the manufacturing process including one or more failures of the manufacturing process, a severity of a failure of the one or more failures of the manufacturing process being derivable from a cluster of the number of distinct clusters; and indicating the failure of the manufacturing process based on the different states of the manufacturing process.

10. A manufacturing system comprising:

a data processing system for indicating a failure of a manufacturing process, the data processing system comprising:

a processor configured to:
receive at least one input signal based on at least one physical quantity monitored during the manufacturing process by at least one sensor;

transform the received at least one input signal into at least one parameter having a different domain than the received at least one input signal;

derive latent features based on the at least one parameter using a machine learning system that is trained on deriving latent features based on the at least one parameter indicative of specific states of the manufacturing process, wherein the machine learning system is a convolutional neural network, the convolutional neural network having hidden layers;

map, using a nonlinear dimensionality reduction technique, the derived latent features, provided by one of the hidden layers of the convolutional neural network, into one of a number of distinct clusters in a two dimensional (2D) cluster space, wherein the number of clusters represent different states of the manufacturing process, the different states of the manufacturing process including one or more failures of the manufacturing process, a severity of a failure of the one or more failures of the manufacturing process being derivable from a cluster of the number of distinct clusters; and indicate the failure of the manufacturing process based on the different states of the manufacturing process; and at least one sensor configured to generate at least one input signal by monitoring at least one physical quantity during conducting a manufacturing process, wherein the generated at least one input signal is provided to the data processing system.

11. The manufacturing system of claim 10, further comprising a press, wherein the at least one sensor is a force sensor configured to generate a force signal by monitoring a pressing force of the press.

12. The manufacturing system of claim 11, wherein the monitored pressing force is a force of a plunger of the press, a force on a mold of the press, or the force of the plunger of the press and the force on the mold of the press.

* * * * *